United States Patent
Engström et al.

(10) Patent No.: US 10,444,119 B2
(45) Date of Patent: Oct. 15, 2019

(54) METHOD AND SYSTEM FOR USE IN DYNAMOMETER TESTING OF A MOTOR VEHICLE

(71) Applicant: Rototest International AB, Rönninge (SE)

(72) Inventors: Christian Engström, Tyresö (SE); Nils G. Engström, Rönninge (SE); Jonny Färnlund, Skärholmen (SE)

(73) Assignee: Rototest International AB, Rönninge (SE)

( * ) Notice: Subject to any disclaimer, the term of this patent is extended or adjusted under 35 U.S.C. 154(b) by 170 days.

(21) Appl. No.: 15/300,670

(22) PCT Filed: Mar. 30, 2015

(86) PCT No.: PCT/SE2015/050383
§ 371 (c)(1),
(2) Date: Sep. 29, 2016

(87) PCT Pub. No.: WO2015/152804
PCT Pub. Date: Oct. 8, 2015

(65) Prior Publication Data
US 2017/0176293 A1   Jun. 22, 2017

(30) Foreign Application Priority Data

Mar. 31, 2014 (SE) ...................... 1450383

(51) Int. Cl.
*G01M 17/007* (2006.01)
*G01M 13/025* (2019.01)
*G01L 3/16* (2006.01)

(52) U.S. Cl.
CPC ............. *G01M 17/007* (2013.01); *G01L 3/16* (2013.01); *G01M 13/025* (2013.01)

(58) Field of Classification Search
CPC .......................... G01M 17/007; G01M 13/025
See application file for complete search history.

(56) References Cited

U.S. PATENT DOCUMENTS

| | | | | |
|---|---|---|---|---|
| 4,301,678 A | * | 11/1981 | Full ..................... | G01M 15/044 702/44 |
| 4,382,388 A | | 5/1983 | Ono | |

(Continued)

FOREIGN PATENT DOCUMENTS

| | | |
|---|---|---|
| EP | 2 161 560 A2 | 3/2010 |
| JP | H10 239219 | 9/1998 |

(Continued)

*Primary Examiner* — Freddie Kirkland, III
(74) *Attorney, Agent, or Firm* — Blank Rome LLP

(57) ABSTRACT

The present invention relates to a method for use in dynamometer testing of a vehicle powertrain component or a vehicle (100), a dynamometer power source (201) of a vehicle dynamometer system being connected to an output shaft of a vehicle powertrain component or a vehicle wheel shaft, said dynamometer system being arranged to measure a reaction load and said method including, when testing: determining a first measure of a first reaction load of said first dynamometer power source, determining an influence of moment of inertia on said first measure of said first reaction load, and compensating said first measure of said first reaction load by said determined influence of moment of inertia.

28 Claims, 4 Drawing Sheets

(56) References Cited

U.S. PATENT DOCUMENTS

| | | | |
|---|---|---|---|
| 4,478,090 A | 10/1984 | McFarland | |
| 4,669,318 A | 6/1987 | Angstrom | |
| 5,078,008 A | 1/1992 | Yagi et al. | |
| 5,323,644 A * | 6/1994 | Schaefer | G01M 17/06 |
| | | | 73/116.06 |
| 7,367,229 B2 | 5/2008 | Engstrom | |
| 7,743,650 B2 | 6/2010 | Engstrom | |
| 8,001,835 B2 | 8/2011 | Engstrom | |
| 8,146,411 B2 * | 4/2012 | Burgess | G09B 9/02 |
| | | | 73/115.07 |
| 8,387,449 B2 | 3/2013 | Engstrom et al. | |
| 8,689,618 B2 | 4/2014 | Engstrom | |
| 9,234,820 B2 * | 1/2016 | Akiyama | G01M 13/025 |
| 9,255,856 B2 * | 2/2016 | Takahashi | G01L 5/24 |
| 9,360,395 B2 | 6/2016 | Engstrom et al. | |
| 9,400,231 B2 * | 7/2016 | Akiyama | G01M 15/04 |
| 9,739,687 B2 * | 8/2017 | Akiyama | G01M 15/02 |
| 9,752,961 B2 * | 9/2017 | Barnes | G01M 17/0072 |
| 2009/0100919 A1 | 4/2009 | Sugita | |
| 2010/0107750 A1 | 5/2010 | Engstrom et al. | |
| 2014/0331980 A1 | 11/2014 | Engstrom | |
| 2015/0039246 A1 * | 2/2015 | Takahashi | G01L 5/24 |
| | | | 702/41 |
| 2015/0219529 A1 * | 8/2015 | Akiyama | G01M 13/025 |
| | | | 73/115.01 |

FOREIGN PATENT DOCUMENTS

| | | |
|---|---|---|
| WO | WO 96/06337 A1 | 2/1996 |
| WO | WO 2007/133154 A1 | 11/2007 |
| WO | WO 2012/053966 A1 | 4/2012 |

* cited by examiner

METHOD AND SYSTEM FOR USE IN DYNAMOMETER TESTING OF A MOTOR VEHICLE

FIELD OF THE INVENTION

This invention relates to dynamometer testing of vehicles, and in particular to a method for use when dynamometer testing vehicles having at least one wheel shaft and a power source for applying power to said first wheel shaft.

BACKGROUND OF THE INVENTION

Dynamometer testing of vehicles is known per se, and can, for example, be carried out by roller type (rolling road) dynamometers equipped with large rollers that support the vehicle wheels, and which are used to apply a brake torque to the drive wheels of the vehicle. Such systems, however, are not always capable of providing the desired measurement accuracy and/or freedom of measurement.

Another kind of vehicle dynamometer systems for dynamometer testing of vehicles is disclosed in U.S. Pat. No. 4,669,318 (Ångström). This document relates to an apparatus for dynamometer testing of vehicles, where load absorbing means in the form of a hydrostatic pump assembly has an input shaft for engagement with a drive shaft of a vehicle to be tested. Each drive shaft is fixedly connected to an individual apparatus of this kind, whereby a total effective torque from the vehicle can be accurately measured.

It is also possible to perform more complex tests using a dynamometer testing system of the kind disclosed in U.S. Pat. No. 4,669,318, both for two-wheel drive systems, and also for four-wheel drive systems. Such more complex testing is, for example, disclosed in the International patent application WO2007/133154 A1 (Engstroem).

Vehicle transmissions are becoming increasingly complex, and may include various kinds of power sources for providing power to wheel shafts of the vehicle. These power sources can be arranged to provide propelling powers, and also braking powers, e.g. when used for regenerative braking. The increased complexity of vehicle transmissions provides corresponding challenges for dynamometer testing systems. There also exist demands for testing where even further information about e.g. the vehicle engine can be obtained. The above also applies to dynamometer testing of vehicle powertrain components.

AIM AND MOST IMPORTANT FEATURES OF THE INVENTION

It is an object of the present invention to provide a method for use in dynamometer testing of vehicles that allows very accurate measurement results.

According to the present invention, it is provided a method for use in dynamometer testing of at least one vehicle powertrain component by measuring on a first output shaft, said first output shaft being connected to a dynamometer power source of a vehicle dynamometer system, said dynamometer system being arranged to measure a reaction load, said method including, when testing at least one vehicle powertrain component:
 determining a first measure of a first reaction load of said first dynamometer power source,
 determining an influence of moment of inertia on said first measure of said first reaction load, and
 compensating said first measure of said first reaction load by said influence of moment of inertia.

According to one embodiment, said first output shaft is a first wheel shaft, e.g. a half shaft, of a vehicle, the vehicle including at least said first wheel shaft and at least one first vehicle power source for providing a load to said first wheel shaft, said first wheel shaft being connected to a dynamometer power source of a vehicle dynamometer system.

According to one embodiment, the dynamometer comprises a stator, a rotor mounted for rotation in the stator, a stator holder supporting the stator and carrying the torque applied to the dynamometer by the driven vehicle shaft, and a device for sensing the reaction torque loading on the stator holder. The rotor can, for example, be a rotor of an electrical machine or the output shaft of a hydraulic pump. The stator being the stator/stator housing of the electrical machine or pump housing of the hydraulic pump.

The use of vehicle dynamometer systems of the kind described above, i.e. systems where dynamometer test units comprising a dynamometer power source are connected to the wheel shafts of a vehicle are capable of providing accurate measurement results when testing vehicles. For example, vehicles can be tested during rapid accelerations, and wheel torque throughout the vehicle engine speed range can be measured in an accurate manner.

In general, torque/load can be arranged to be measured by measurement means measuring directly on the shaft being tested. Such measurements, however, face difficulties e.g. with regard to rotating parts etc. Alternatively, the torque load applied on a rotating shaft can be measured, as in the present invention, by measuring the reaction load. Measurements of reaction load/torque uses the fact that for every action there is an equal and opposite reaction. With regard to dynamometer measurements this means that the load/torque can be measured by measuring the amount of load/torque that is required to prevent, in this case, the dynamometer test unit, from turning. This load is commonly called and defined, and also herein defined, the reaction load.

The present invention consequently relates to dynamometer test systems where a reaction load is measured, and provides a measurement method that allows even more accurate measurements when measuring reaction loads, in particular during acceleration and deceleration of the shaft to which the dynamometer is connected. The invention can be used, e.g. for vehicle dynamometers where the dynamometer is connected to a wheel shaft of the vehicle. The present invention also relates to dynamometers performing tests on one or more vehicle powertrain components.

In general, when vehicles and/or powertrain components are being tested, the load on the dynamometer test unit, e.g. the torque exhibited by the dynamometer test unit, can be accurately measured, where this measurement result provides satisfactory results. However, the inventors of the present invention has realized that measurement accuracy can be even further improved, and this is accomplished by compensating the measured reaction load with the synchronous influence that the moment of inertia of the dynamometer test unit has on the measurement result. Moments of inertia resulting from acceleration/deceleration of the rotating shaft and rotating parts connected thereto are not reflected in a reaction load measurement.

The present invention is therefore, in particular, applicable when the rotational speed of the wheel shaft undergoes acceleration or deceleration. In such situations, the moment of inertia of the dynamometer test unit, e.g. due to the weight of the rotating parts of the dynamometer test unit, will have an impact on the measurement result, that is, part of the load will be consumed for acceleration or deceleration of the rotating parts of the dynamometer test unit, and hence the portion of the load being consumed by moment of inertia of the dynamometer test unit will not be reflected in the reaction load measurement result. According to the invention, the measured reaction load is therefore compensated with such influence of the moment of inertia, where the compensation preferably is synchronized with the measurement of the reaction load.

Consequently, the invention is applicable during testing of acceleration and/or retardation of the vehicle, and tests have proven accuracies in the order of Ncm (Newton centimeters), thereby allowing very high measurement accuracy.

Furthermore, the invention is also applicable, and perhaps in particular suitable for, use in other kinds of measurements. For example, as is known to a person skilled in the art, a conventional internal combustion engine transfers cylinder pressure into a rotational movement over a piston, a connecting rod and a crankshaft. The combustion energy is released during only a part of a crank shaft cycle (i.e. a 360 degree rotation of the crank shaft). The result is a pressure increase in the cylinder, which in turn results in a corresponding increased torque at the crankshaft. Correspondingly, a compression stroke of e.g. a four stroke engine will provide a braking torque on the crankshaft. The torque thus varies over the 360 degree rotation of the crank shaft, which results in irregularities in the rotating motion. In order to reduce these irregularities, engines normally have flywheels.

A flywheel having a greater moment of inertia gives a greater reduction of the irregularities. At the same time, heavy flywheels are associated with drawbacks, e.g. with regard to weight and transient performance. For this reason, irregularities remain in the drive train, although more or less equalized, and are transferred to the output shaft. These irregularities, or variations, with regard to load (torque) and also with regard to rotational speed of the wheel shaft, can be identified by the dynamometer test unit, and, according to the invention, the measured variations can be compensated to take influence of the moment of inertia of the dynamometer test unit into account.

Consequently, variations during crank shaft rotations can be determined also in steady state operation, and according to the invention measurements of these variations can be compensated for influence of the moment of inertia of the dynamometer test unit also for variations occurring during such small periods of time as being represented by part of a rotation of the crank shaft, and hence variations occurring within a single engine cycle. As is well known to a person skilled in the art an engine cycle is a period of time during which the engine output shaft (crankshaft) of a four-stroke engine will rotate two revolutions, and of a two-stroke engine will rotate one revolution.

Measurements of variations of this kind have the advantage that e.g. torque contribution from one or more individual cylinders of the vehicle engine can be identified and evaluated. This allows that, for example, possible defects and possible potential improvements can be specifically linked to the individual cylinders of the engine, including valve arrangements, port design in respect of their fuel and air feed, as well as exhaust arrangements.

Consequently, variations of said first reaction load occurring during a single engine cycle can be determined, and these variations can be compensated by the influence of said moment of inertia of said first dynamometer test unit by measuring the acceleration for the moment in time for which the load is measured so that precisely the influence of moment of inertia of the dynamometer test unit for this moment in time can be used to compensate the measurement result. Consequently, measurement of reaction load and determination of acceleration can advantageously be synchronized.

Measurements of variations and associated compensation for influence of moment of inertia are advantageously performed for a plurality of, consecutive or non-consecutive, engine cycles, e.g. continuously, and this can be used, e.g., to monitor real-time adjustments of the engine so as to immediately see the effect of the said adjustments.

The method can be performed in a vehicle dynamometer system where the dynamometer test units are of a kind having an electrical machine as power source. The dynamometer test units may also have controllable hydraulic pumps for controlled braking so as to apply a braking torque to wheel shafts of a motor vehicle during the testing process.

The dynamometer test unit may also be of a kind having two (or more) dynamometer power sources for providing power to a same wheel shaft, such as e.g. a half shaft, of the vehicle, where one of said power sources can be an electrical machine. This kind of dynamometer test units may allow a more favourable design with respect to cost/space/infrastructure requirements than would be the case with a single power source having the total capability of the two dynamometer power sources taken together. In this case, the influence of moment of inertia of each participating power source can be determined and used for compensating the measurements.

Further features of the present invention and advantages thereof will become clear from the following detailed description of illustrative embodiments and from the attached drawings.

BRIEF DESCRIPTION OF DRAWINGS

The invention will now be described in greater detail with reference to the drawings, wherein.

DESCRIPTION OF EXEMPLARY EMBODIMENTS

Figure 1:
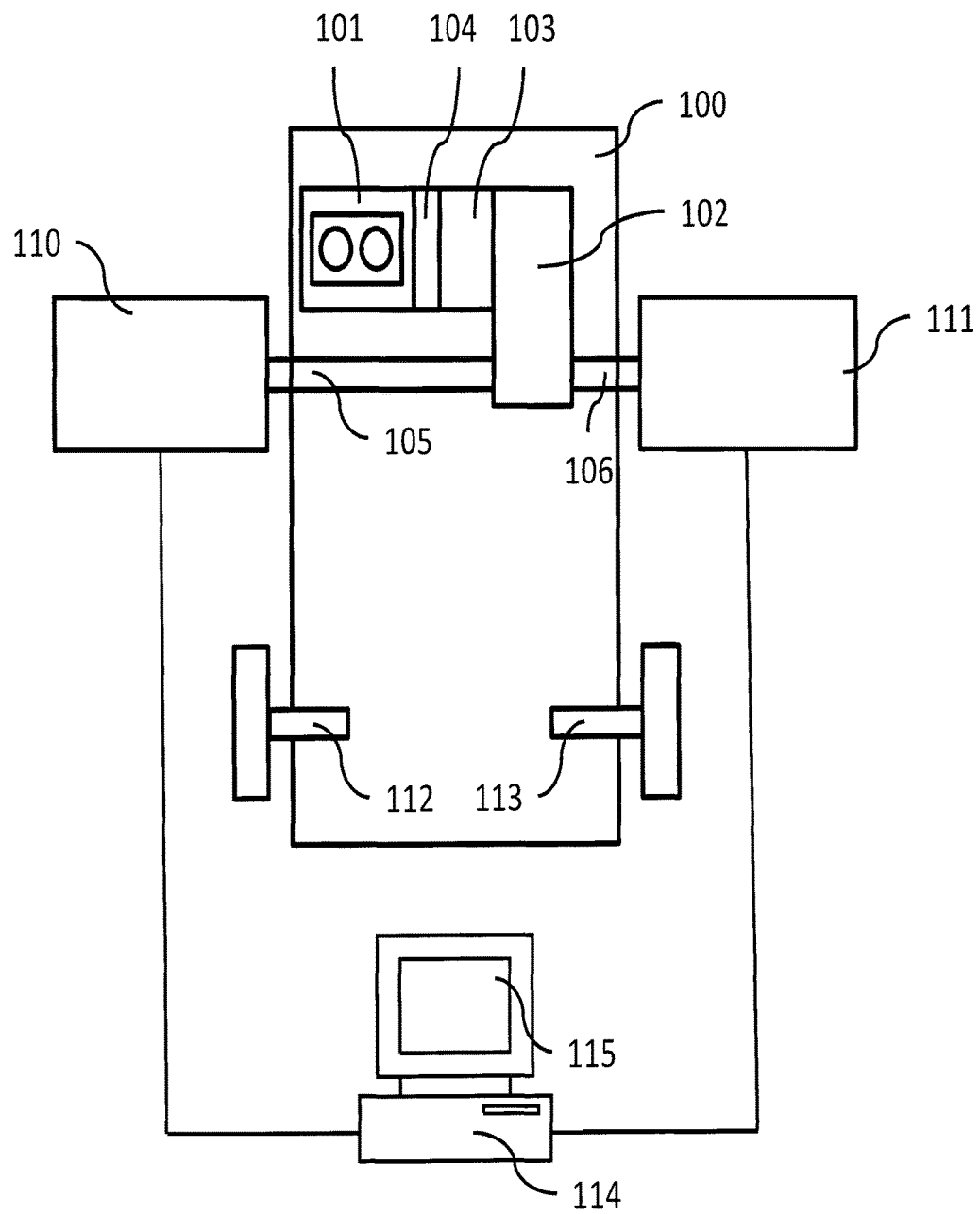
FIG. 1 shows an exemplary vehicle dynamometer system according to the present invention.

FIG. 1 discloses a vehicle 100 set up for being tested with a vehicle dynamometer system according to the present invention.

The vehicle 100 is a two-wheel drive vehicle, and includes front axle wheel shafts 105, 106, and rear axle wheel shafts 112, 113. The wheels of the vehicle 100 are not shown due to the vehicle being set up for dynamometer testing.

The disclosed vehicle 100 includes a drive train, which includes a combustion engine 101 which is connected to a gearbox 102. The gearbox 102 can be of any suitable kind and, e.g., consist of a manual transmission or an automatic transmission. The front axle wheel (drive) shafts, such as half shafts, 105, 106 extend from the gear box to the front axle wheels of the vehicle 100.

The vehicle 100 further includes an electric motor 103, which is connected in series with the combustion engine upstream of the gearbox 102, but downstream a clutch 104.

A vehicle dynamometer system is connected to the vehicle 100, and includes dynamometer test units 110, 111. The dynamometer test units 110, 111 are connected to a measuring and control system 114, such as e.g. a computer with associated display 115, by means of which the tests are controlled, and by means of which an operator of the system can initiate tests and provide necessary information for performing the dynamometer tests.

During testing, the measuring and control system 114 transmits control signals to the dynamometer test units to request desired load (torque) and rotational speed. Torque and rotational speed can be measured in different ways, as explained below. The dynamometer test units 110-111 can consist of substantially identical test units, and are described more in detail in FIG. 2.

Figure 2:
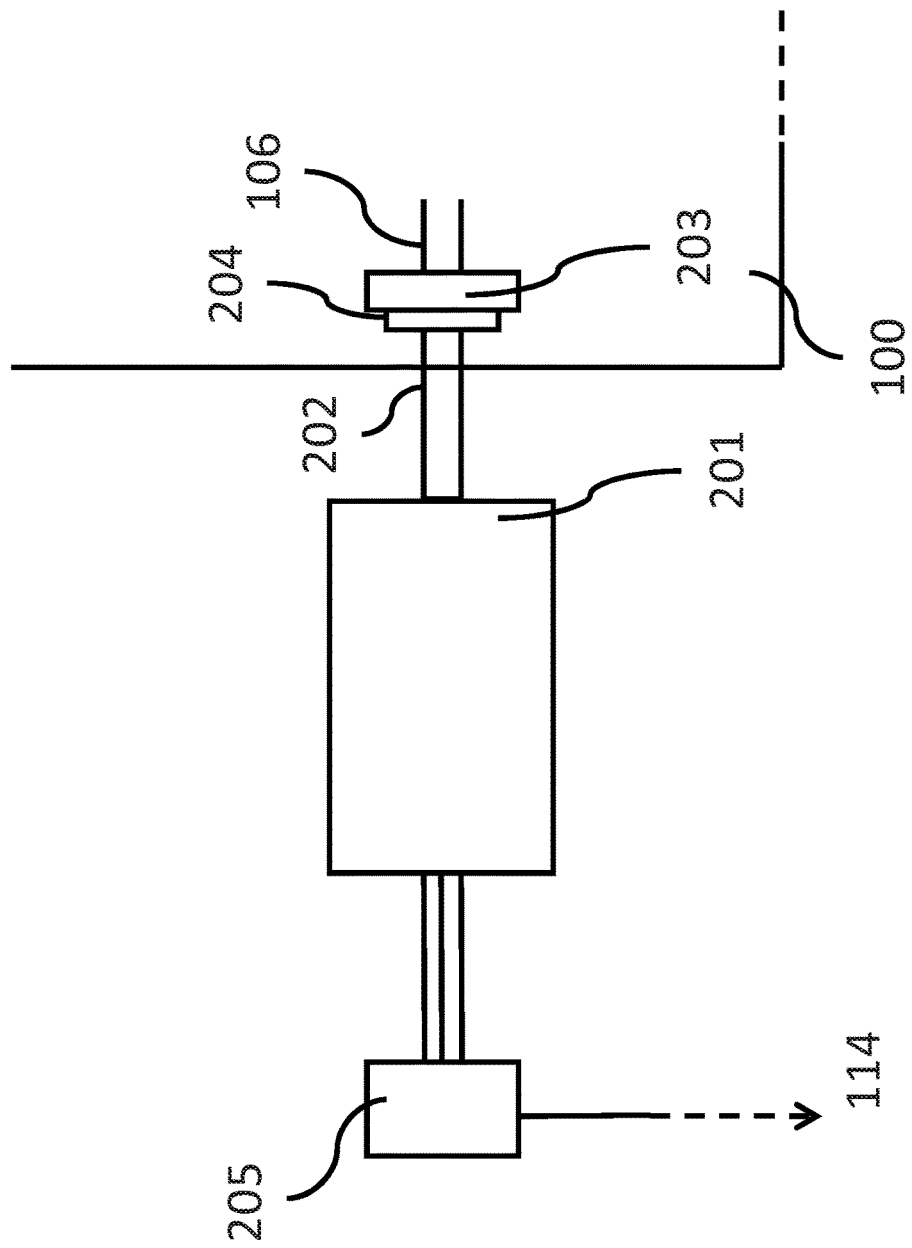
FIG. 2 shows a dynamometer test unit of the system disclosed in FIG. 1 more in detail.

FIG. 2 shows an example of a test unit 111 according to the present invention, each dynamometer test unit 110, 111 includes an electrical machine 201 and means for measuring the torque applied to an output shaft 202 of the electrical machine. As was mentioned above, the present invention relates to devices measuring the reaction force, and according to the disclosed embodiment the reaction load/torque can be arranged to be measured by means of a torque transducer utilizing strain gauges and/or using the electrical drive system that is used to control the electrical machine according to the below.

The electrical machine output shaft 202 is arranged to be rigidly connected to a drive shaft 106 of the vehicle 100. The rigid connection can be accomplished, e.g. by removing the vehicle wheel and attaching the output shaft 202 of the electrical machine 201 to the wheel hub 203, directly or by means of a suitable adapter 204, so as to obtain a rigid connection between vehicle 100 and dynamometer test unit 111 in a simple manner utilizing the existing wheel fasteners of the vehicle 100. The rigid connection has, inter alia, the advantage that rotational speed of the wheel shaft can be measured by a suitable sensor measuring rotational speed of the output shaft 202 of the electrical machine 201. The sensor signals from the sensor measuring the rotational speed can then be used to determine the acceleration of the shaft. The use of electrical machines as in the present example has the advantage that a general desire for sophisticated measurements e.g. of drive trains of the disclosed kind can be fulfilled by the use of electrical machines as power source, which can be used as power-absorbing means as well as being able to provide propelling power, e.g. to enable simulation of regenerative braking. According to one embodiment, as explained below, the power sources consist of hydraulic pump assemblies instead, or a combination of two or more power sources.

The dynamometer test units 111, 112, which e.g. can be standing freely on a floor, are thus connected to the vehicle only by means of a (rigid) coupling to the wheel shafts (wheel hubs) (and possibly some kind of electronic wire connection for communication with the vehicle control system), and hence preferably also "carry" the weight of the vehicle in place of the wheel that has been taken off. This is known per se e.g. from earlier patent applications identified above and/or having one or more of the inventors of the present invention as inventors. Also the testing is known per se e.g. from said earlier patent applications.

The electrical machine (electric motor) 201 is power supplied via a power grid by means of an electric motor drive 205, and can constitute e.g. an AC motor. The electric motor drive 205 is controlled by the measuring and control system 114 so that the electric motor 201 can be set to a desired rotational speed and torque. In the figure, the electric motor drive 205 is shown as being arranged separate from the electric motor 201, e.g. mounted on a wall or as a free standing cabinet, and connected to the electric motor 201 by means of one or more cables.

With regard to electric motor drives of the disclosed kind, these can be used to very accurately control the speed and load torque of electric motors, and advantageously be used when implementing a dynamometer test unit according to the present invention. Such drives often involve direct torque control, DTC, which allows the torque of the electric motor to be the primary control element and not the motor current.

The torque of the electric motor, be it a load torque or propelling torque, can be controlled from zero to full torque within a very short period of time, e.g. milliseconds, which thus makes such drives very suitable for dynamometer testing of vehicles. The applied torque can also be speed controlled and hence be applied for any rotational speed, even stand still.

Vehicle dynamometer systems of the disclosed kind are favourable e.g. for use when testing vehicles having a drive train with one or more electric motors, e.g. hybrid vehicles, e.g. of the kind disclosed in FIG. 1. This testing is not described herein, since it, as mentioned above, is well described in earlier applications according to the above.

As is known to a person skilled in the art, there exist various kinds of electric hybrid drives, and the present invention can be utilized in testing of any such kind. Furthermore, the invention is not limited to use in connection with hybrid vehicles, but can be utilized e.g. in testing of electric vehicles and conventional combustion engine vehicles as well.

Figure 3:
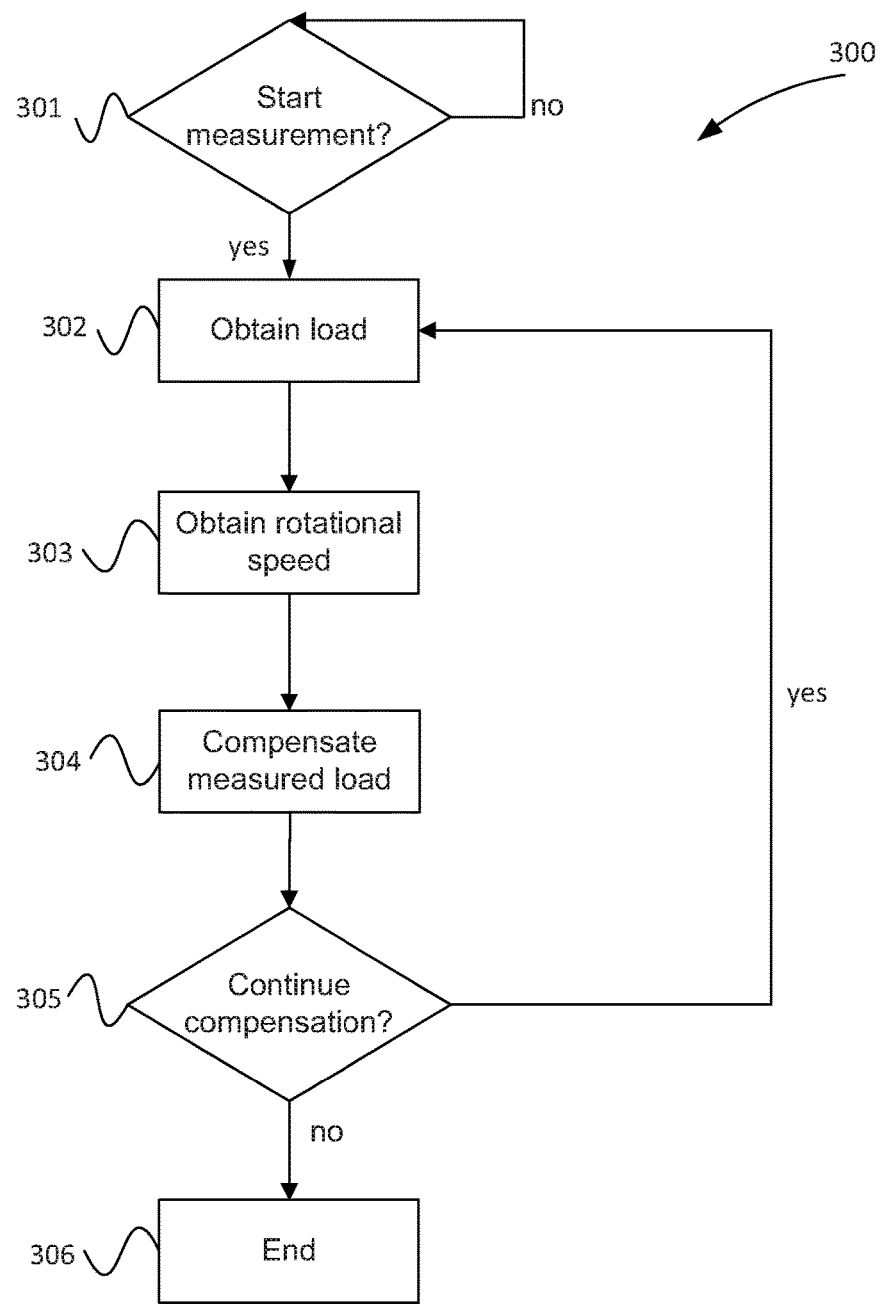
FIG. 3 shows an exemplary method according to the present invention.

The present invention is related to a method for further increasing measurement accuracy when testing vehicles, and an exemplary method 300 according to the invention is shown in FIG. 3. The invention will be exemplified for testing where variations occurring during an engine cycle are identified. As is realized, the invention is equally applicable for testing where e.g. variations occurring during an engine cycle are not determined and where testing is performed e.g. during acceleration or deceleration of the vehicle from a first to a second vehicle speed and the acceleration/deceleration thus spanning over a large number of engine cycles.

The method 300 starts in step 301, where it is determined whether measurement is to be started, which e.g. can be initiated by the measurement and control system and/or an operator of the system. The method according to the invention can, e.g., be arranged to be continuously carried out during testing of the vehicle. When the method is to be carried out the method continues to step 302.

In step 302, a measure of the reaction load, such as a measure of the reaction torque, is obtained, which, as stated above, e.g. can be determined by means of signals from a torque transducer e.g. as described in U.S. Pat. No. 4,669,318 or other suitable manner, and/or by means of the electrical drive system, thereby measuring the load that the vehicle shaft exerts on the dynamometer test unit. The reaction load (torque) can e.g. be arranged to be measured continuously during testing. The measurement can consist of a continuous reception of measurements signals, which e.g. can be given by some suitable sampling rate.

In step 303, rotational speed of the wheel shaft is obtained, which, e.g., can be determined by means of a suitable sensor, which e.g. can be arranged to measure the rotational speed of the output shaft of the electrical machine or, for example, input shaft of an hydraulic pump if such is used instead of an electrical machine. Similar to the measurement of the reaction load of the dynamometer test unit, the rotational speed of the output shaft of electrical machine, and thereby also of the wheel shaft, can be arranged to be measured continuously during the testing, and the measurement can consist of a continuous reception of measurements signals which e.g. can be given by some suitable sampling rate.

Figure 4:
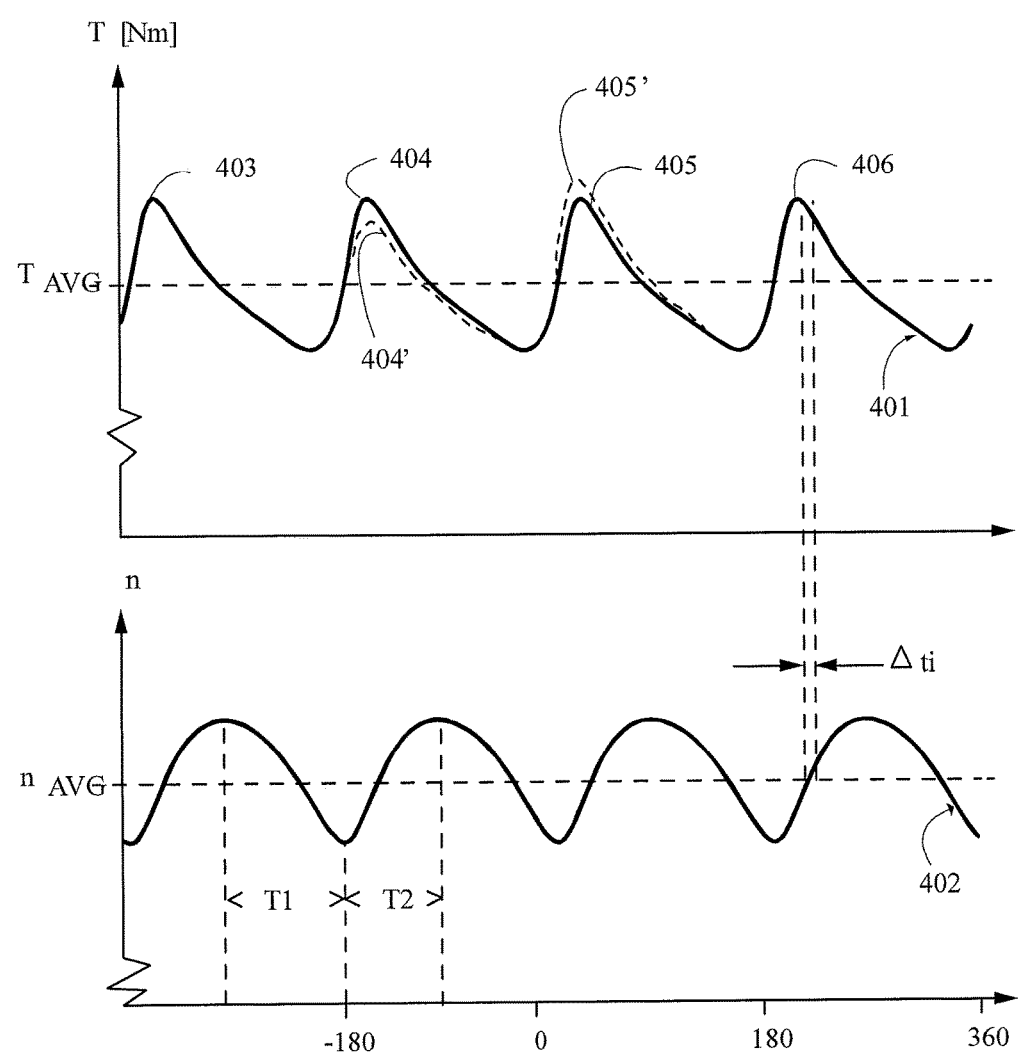
FIG. 4 shows an example of a measurement using the vehicle dynamometer system.

According to the present embodiment, the measurement (e.g. the sampling of) of load and measurement of rotational speed is synchronized, i.e. for each determination of a load a corresponding rotational speed (acceleration) are determined for the same point in time. This is illustrated in FIG. 4, where a curve 401 represents variations in reaction torque (load) as measured by the dynamometer test unit. Correspondingly, the curve 402 represents variations in rotational speed as measured according to the above. The illustrated variations are variations occurring during a short period of time, and the curves are functions of crankshaft degrees. As can be seen from the figure, 720 crankshaft degrees are disclosed (−360 degrees −360 degrees) which corresponds to one engine cycle of a four stroke internal combustion engine. The disclosed example is of a four cylinder engine, where the peaks 403-406 represent the torque contribution from the individual cylinders of the engine.

Measurements of the disclosed kind provides advanced possibilities to analyze the engine in detail, e.g. in regard of individual cylinder torque contributions for different operating conditions, such as at varying load, engine speed, fuel feed, inlet/exhaust pressures, ignition position etc. The peaks of the curve 401 can be related to specific cylinders of the engine, e.g. by adding a signal from an index point on an engine output shaft.

The representation gives the possibility to accurately analyze e.g. how different parameters influence, inter alia, torque output, in that torque contribution changes resulting from changes in the different operating parameters can easily be monitored.

As an example, dashed line 404' is a curve portion of torque contribution from one cylinder indicating that, for the particular cylinder and with the operating parameters prevailing when the representation is made, the torque contribution is below a mean value for all the operating cylinders. Using this information it is possible to make e.g. adjustments in order to identify the reason of the poor output from that particular cylinder. Conversely, the cylinder contribution can exceed the mean value. Such information is also of interest, since it indicates e.g. that operation of the other cylinders may be enhanced. This is illustrated by dashed line 405'.

The situation illustrated in FIG. 4 can represent e.g. steady state operation, where the vehicle is driven at constant speed. As has been explained above, the wheel shaft will still exhibit the behavior shown in FIG. 4 with constant variations in speed due to the torque variations caused by the strokes of the engine, where the torque varies about an average value $T_{AVG}$, and the rotational speed about an average rotational speed $n_{AvG}$.

Due to these variations, the moment of inertia of the dynamometer test units will influence the measurement results even in steady state operation, since the rotational speed is continuously changing. For example, the wheel shaft will exhibit a retardation in the period T1 illustrated in FIG. 4, and, correspondingly, an acceleration in the period T2.

In step 404, the measured reaction load is compensated for the influence of the moment of inertia of the dynamometer test unit, which can be performed e.g. by eq. (1):

$$T_{comp} = T_{meas} + \dot{n}J \quad (1)$$

Where $T_{comp}$ represents the compensated reaction load, $T_{meas}$ is the measured reaction load, $\dot{n}$ is the acceleration of the wheel shaft (output shaft of the electrical machine) and J is the moment of inertia of the electrical machine and possible other rotating parts of the dynamometer test unit, such as e.g. the adapter 204.

It is to be noted that when the dynamometer test unit provides a propelling power, the reaction load that is measured by the measurement sensor will include the impact of the moment of inertia of the dynamometer test unit. In this case therefore, the influence of inertia must be subtracted from the measured reaction load in order to obtain an accurate measurement result. Consequently, in this case, the compensated reaction load can be determined as:

$$T_{comp} = T_{meas} - \dot{n}J \quad (2)$$

The moment of inertia of the electrical machine J can be calculated and/or measured beforehand to be stored e.g. in the measuring and control system 114. The acceleration $\dot{n}$ can be determined e.g. by determining $$\frac{\Delta n}{\Delta t}$$

for consecutive measurements of the rotational speed, where $\Delta t$ preferably is short, since the determined acceleration will be valid throughout the interval $\Delta t$ for corresponding load in the interval $\Delta t$ when compensating the load. $\Delta t$ can e.g. be in the order of milliseconds ms or less. $\dot{n}$ can be arranged to be determined continuously as measurement results are obtained.

When compensating the load for behaviors as shown in FIG. 4 where the acceleration $\dot{n}$ varies substantially during a short period of time, the measurements of reaction load and rotational speed are preferably synchronized as mentioned above, so that accurate compensation of the reaction load is obtained, i.e. the reaction load is compensated by calculating the impact of moment of inertia using the acceleration that is prevailing at the instant the particular load is prevailing. This is illustrated in FIG. 4, where the calculated acceleration $\dot{n}$ for period $\Delta t_i$ is used for compensating the measured reaction load for the same period $\Delta t_i$, where, as mentioned, the period $\Delta t_i$ preferably is small, and e.g. being dependent on the sampling rate by means of which measurement results are obtained.

When compensation has been performed in step 304, the method can return to step 302 for further measurements for as long as it is determined that this is to be performed, step 305, otherwise the method is ended in step 306, e.g. if the testing of the vehicle is ended. The compensation of the measurements can be arranged to be performed continuously in substantially real-time during testing, e.g. for each short period of time such as $\Delta t_i$ above, or, alternatively, measured reaction load and speed can be recorded for some suitable period of time after which the compensation calculations can be performed based on the recorded data.

The present invention, consequently, provides a method that results in very accurate measurements, even during dynamic behaviors, and hence very accurate testing of the vehicle can be performed.

According to the above disclosed embodiment, the electrical machine output shaft 202 has been described as being rigidly connected to a drive shaft 106 of the vehicle 100. According to one embodiment, the dynamometer test unit 111 is still rigidly connected to a drive shaft of the vehicle. However, according to this alternative embodiment the electrical machine output shaft is semi-rigidly connected to e.g. a hub being rigidly connected to the drive shaft. For example, the hub and electrical machine output shaft may be connected using a spline coupling. The electrical machine stator is still rigidly connected to the dynamometer test unit, and the measured reaction load is still measured according to the above, and compensation is accomplished according to the above, but according to the below slightly different system states may arise.

The semi-rigid coupling means that there may be a small play, when a rotation is commenced, or when a direction of rotation is changed. That is one of the elements hub and electrical machine output shaft may be slightly rotated before gripping the other element and bringing this into synchronous rotation with the first element. The situation may occur also in accelerations and/or decelerations. This play may be e.g. in the order 0.5-3 degrees with the result that e.g. the hub, or electrical machine output shaft, may have rotated slightly prior to the other of the two starts rotating and conditions becomes fully according to the above. Also, the play may result in the hub and electrical machine output shaft rotating at different speeds and exhibiting different accelerations for a short period of time.

When only one of the hub and electrical machine is accelerating, or when the two elements are undergoing different accelerations (still during a relatively short period of time), the compensation of the inertia according to the above must be changed somewhat in a system of this kind. For example, if only the hub has started to rotate, the moment of inertia is considerably smaller than the combined moment of inertia of the hub and the output shaft of (and hence rotor of) the electrical machine, and hence a compensation also for the moment of inertia of the electrical machine would result in an overcompensation. The time during which the play gives rise to situations of this kind is generally small, e.g. up to 20 ms or 50 ms, but resolution in measurements in the order of 1 ms or even less is becoming increasingly requested, and hence a "compensation of the compensation" can be made to take into account also situations of this kind.

Therefore, according to one embodiment, such play is taken into account and moment of inertia is compensated for individually for hub and electrical machine. This requires suitable sensor means for individual measurement of the rotation of electrical machine output shaft and the rotation of the hub, but otherwise compensation is performed similar to the above, where hub and electrical machine can be treated as separated entities, at least in times of the occurrence of a play. As soon as the play has been overcome the hub and electrical machine output shaft will rotate synchronously and the situation will be completely according to the above.

According to the above described example, each dynamometer test unit comprises a single power source consisting of an electrical machine. According to one embodiment, the dynamometer test unit comprises two or more individually controllable power sources, which can be electrical machines, hydraulic pumps or any suitable combination thereof. If two or more power sources are used for a single dynamometer test unit, the moment of inertia can be separately determined for the power sources so that only moment of inertia (power sources) currently participating in the measurements are used when compensating the results.

Above, the present invention has been exemplified in connection with testing of a hybrid drive vehicle. Naturally, the present invention is applicable for testing of any kind of vehicle, such as a conventional two or four wheel drive combustion engine vehicle, or any other kind of hybrid vehicle other than what has been disclosed above. Consequently more than two dynamometer test units can be used for being connected to more than two wheels, and it is also contemplated that only one wheel shaft is connected to a dynamometer test unit, e.g. if an electric motor of the vehicle acts only on one wheel shaft.

As is apparent from the above, the term power source means a power source that is capable of subjecting a wheel shaft to a power (torque), be it a propelling (positive) torque or braking (negative) torque or a combination of both.

The present invention can be implemented e.g. in the measuring and control system 114. The method can further be realized by the use of programmed instructions. These programmed instructions typically consist of a computer program which, when it is executed in a computer or control unit, causes the computer/control unit to perform the desired control, such as method steps according to the present invention.

The computer program is usually part of a computer program product, where the computer program product comprises a suitable storage medium with the computer program stored on said storage medium. Said storage medium can be a non-transient storage medium.

Finally, it should be understood that the present invention is not limited to the embodiments described above, but relates to and incorporates all embodiments within the scope of the appended independent claims.

The invention claimed is:

1. Method for use in dynamometer testing of a at least one vehicle powertrain component by measuring on a first output shaft, said first output shaft being connected to a dynamometer power source of a dynamometer test unit of a dynamometer system, said dynamometer system being arranged to measure a reaction load, the dynamometer test unit comprising a stator, a rotor mounted for rotation in the stator, a stator holder supporting the stator and carrying the torque applied to the dynamometer test unit by the driven vehicle shaft, and a device for sensing the reaction torque loading on the stator holder, said method including, when testing said at least one vehicle powertrain component:
    determining a first measure of a first reaction load of said dynamometer power source,
    determining an influence of moment of inertia on said first measure of said first reaction load, said influence of moment of inertia on said first measure reaction load being an influence of moment of inertia of said dynamometer test unit, and
    compensating said first measure of said first reaction load by said determined influence of moment of inertia.

2. Method according to claim 1, said first output shaft being a first wheel shaft of a vehicle, the vehicle including at least said first wheel shaft and at least one first vehicle power source for providing a load to said first wheel shaft, said first wheel shaft being connected to the dynamometer power source of the vehicle dynamometer system.

3. Method according to claim 1, said first measure of said first reaction load being a representation of a torque.

4. Method according to claim 1, said dynamometer power source applying a load to said first output shaft, said moment of inertia of said dynamometer test unit at least partly being a moment of inertia of said dynamometer power source.

5. Method according to claim 1, further including:
compensating said first measure of said first reaction load during acceleration and/or deceleration of said first output shaft.

6. Method according to claim 1, further including:
determining the influence of the moment of inertia of said dynamometer test unit using a representation of acceleration of said first output shaft.

7. Method according to claim 1, further including:
determining a plurality of measures representing variations of said first reaction load occurring during a single engine cycle, and
compensating said measures representing said variations of said first reaction load by the influence of said moment of inertia of said dynamometer test unit.

8. Method according to claim 7, said variations occurring during steady state operation of a vehicle power source.

9. Method according to claim 1, further including:
determining said measure of said first reaction load when a load is applied to said first wheel shaft by a first vehicle power source.

10. Method according to claim 1, further including:
determining a representation of rotational speed and/or acceleration of said first output shaft for the moment in time for which said measure of said first reaction load is determined, and compensating said measure of said first reaction load based on moment of inertia determined from said rotational speed and/or acceleration.

11. Method according to claim 1, further including:
determining said compensated first measure of said first reaction load as an aggregate of said first measure of first reaction load and a second measure representing the influence of the moment of inertia of said dynamometer unit on said first measure.

12. Method according to claim 11, further including, when said dynamometer test unit applies a braking power:
estimating said first reaction load as $T_{comp}=T_{meas}+\dot{n}J$, where $T_{comp}$ is compensated load, $T_{meas}$ is said measure of said first reaction load, $\dot{n}$ is a representation of acceleration of said first output shaft, $J$ is the moment of inertia of said first dynamometer test unit.

13. Method according to claim 11, further including, when said dynamometer test unit applies a propelling power:
estimating said first reaction load as $T_{comp}=T_{meas}+\dot{n}J$, where $T_{comp}$ is compentsated load, $T_{meas}$ is said measure of said first reaction load, $\dot{n}$ is a representation of acceleration of said first output shaft, $J$ is the moment of inertia of said first dynamometer test unit.

14. Method according to claim 1, further including:
determining said influence of said moment of inertia as a product of moment of inertia of said dynamometer unit and a representation of acceleration of said first output shaft.

15. Method according to claim 1, further including:
determining a power of said first output shaft using said compensated first measure of said first reaction load and a representation of rotational speed of said first output shaft.

16. Method according to claim 1, said dynamometer test unit comprising at least two power sources, said influence of moment of inertia of said dynamometer test unit being an influence of moment of inertia of one or more of said at least two power sources.

17. Method according to claim 1, further including determining a representation of rotational speed of said first output shaft by determining a rotational speed of a shaft of said dynamometer test unit.

18. Method according to claim 1, said first output shaft being connected to a first rotating element of said first dynamometer test unit, a rotating element of said dynamometer power source being connected to said first rotating element by means of a coupling involving a play, said method further including,
determining individually an influence of moment of inertia of said first rotating element and said rotating element of said dynamometer power source on said first measure of said first reaction load, and
compensating said first measure of said first reaction load by said determined influences of moment of inertia.

19. Method according to claim 18, further including:
when determining individually an influence of moment of inertia of said first rotating element and said rotating element of said dynamometer power source, determining individually a rotational speed of said first rotating element and a rotational speed of said dynamometer power source.

20. Computer program comprising a program code stored on a non-transitory computer-readable medium which, when said program code is executed in a computer, causes said computer to perform the method according to claim 1.

21. Computer program product comprising the non-transitory computer-readable medium and the computer program according to claim 20.

22. Vehicle dynamometer system according to claim 21, wherein the dynamometer test unit is arranged to be standing freely on a surface and connected to the vehicle by means of rigid coupling to the wheel shaft, while supporting the weight of the vehicle by means of said rigid coupling.

23. Dynamometer system for testing of at least one vehicle powertrain component by measuring on a first output shaft, said dynamometer system comprising at least one dynamometer test unit having at least a first controllable dynamometer power source being arranged to, in use, provide a load to the first output shaft of a vehicle powertrain component being tested, said dynamometer system being arranged to measure a reaction load, the dynamometer test unit comprising a stator, a rotor mounted for rotation in the stator, a stator holder supporting the stator and carrying the torque applied to the dynamometer test unit by the driven vehicle shaft, and a device for sensing the reaction torque loading on the stator holder, and said dynamometer test system further including:
means for, in use, determining a first measure of a first reaction load of said first dynamometer power source,
means for determining an influence of moment of inertia on said first measure of said first reaction load, said influence of moment of inertia on said first measure of said first reaction load being an influence of moment of inertia of said first dynamometer unit, and
means for compensating said first measure of said first reaction load by said determined influence of moment of inertia.

24. Dynamometer system according to claim 23, said dynamometer system being a vehicle dynamometer system for testing of a vehicle, said at least a first controllable dynamometer power source being arranged to, in use, provide a load to a first wheel shaft of a vehicle being tested.

25. Vehicle dynamometer system according to claim 24, wherein said dynamometer test unit includes means for being rigidly coupled to said first wheel shaft.

26. Vehicle dynamometer system according to claim 24, wherein said dynamometer test unit is arranged to be connected to said vehicle by connecting the dynamometer test unit to a wheel hub of said wheel shaft by means of a direct-coupling.

27. Vehicle dynamometer system according to claim 26, wherein said first dynamometer test unit comprising a first rotating element to be connected to said vehicle by connecting the dynamometer test unit to a wheel hub of said wheel shaft by means of a direct-coupling, a rotating element of said dynamometer power source being connected to said first rotating element by means of a coupling involving a play, said vehicle dynamometer system further including means for determining individually an influence of moment of inertia of said first rotating element and said rotating element of said dynamometer power source on said first measure of said first reaction load, and compensating said first measure of said first reaction load by said determined influences of moment of inertia.

28. Vehicle dynamometer system according to claim 27, wherein said dynamometer power source is an electrical machine, and said rotating element of said electrical machine including a rotor of said electrical machine.

\* \* \* \* \*